US008793598B2

(12) United States Patent
Zhu et al.

(10) Patent No.: US 8,793,598 B2
(45) Date of Patent: Jul. 29, 2014

(54) CROSS-BROWSER WEB DIALOG PLATFORM

(75) Inventors: Shaofeng Zhu, Bellevue, WA (US);
Cindy Liao, Bellevue, WA (US);
Zachary Nation, Seattle, WA (US);
Charles Reeves Little, Bellevue, WA (US); Tim McConnell, Kirkland, WA (US); Jeff Crowley, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 12/759,996

(22) Filed: Apr. 14, 2010

(65) Prior Publication Data
US 2011/0258562 A1 Oct. 20, 2011

(51) Int. Cl.
*G06F 3/01* (2006.01)
(52) U.S. Cl.
CPC .......................................... *G06F 3/01* (2013.01)
USPC ........................................... 715/760; 715/744
(58) Field of Classification Search
USPC ................. 715/744, 523, 762, 788, 866, 779; 709/224
See application file for complete search history.

(56) References Cited

U.S. PATENT DOCUMENTS

| 5,914,714 | A  | * | 6/1999  | Brown        | 715/866 |
|-----------|----|---|---------|--------------|---------|
| 7,412,655 | B2 | * | 8/2008  | Wada et al.  | 715/744 |
| 7,640,505 | B1 | * | 12/2009 | Edmunds      | 715/744 |
| 2002/0059261 | A1 | * | 5/2002  | Pollock   | 707/100 |
| 2002/0152238 | A1 | * | 10/2002 | Hayes     | 707/513 |
| 2005/0120308 | A1 | * | 6/2005  | Gibson et al. | 715/779 |
| 2006/0031663 | A1 |   | 2/2006  | Peller et al. |         |
| 2006/0253796 | A1 | * | 11/2006 | Wang et al.  | 715/788 |
| 2006/0253799 | A1 |   | 11/2006 | Montroy et al. |       |
| 2007/0050710 | A1 | * | 3/2007  | Redekop      | 715/523 |
| 2008/0201648 | A1 | * | 8/2008  | Earp et al.  | 715/762 |
| 2008/0228910 | A1 | * | 9/2008  | Petri        | 709/224 |

OTHER PUBLICATIONS

"Cross Browser iframe Auto Resixe Script Solution Web Standards # 2184189", Retrieved at << http://www.johns-web-site.com/index.php?month=2010-01&id=2184189 >>, Jan. 2010, pp. 3.
"Chapter: 6.9 Simulating a Cross-Browser Modal Dialog Window", Retrieved at << http://etutorials.org/Programming/Java+script+and+dhtml/Chapter+6.+Managing+Browser+Windows/6.9+Simulating+a+Cross-Browser+Modal+Dialog+Window/ >>, Retrieved Date: Feb. 25, 2010, pp. 6.
"Cross Browser DHTML Modal Dialogs for Web Apps", Retrieved at << http://sublog.subimage.com/2006/01/01/subModal >>, Nov. 1, 2007, pp. 3.
Shiran, et al., "Modal and Modeless Dialog Boxes", Retrieved at << http://www.webreference.com/js/column90/4.html >>, Aug. 13, 2001, pp. 3.
Huen, Stephen., "MCMS Placeholder Content Web Part", Retrieved at << http://www.codeproject.com/KB/MCMS/cmswebpart.aspx?display=Print >>, Jan. 22, 2005, pp. 4.

* cited by examiner

*Primary Examiner* — Ryan Pitaro
*Assistant Examiner* — Tuan S Nguyen
(74) *Attorney, Agent, or Firm* — Tom Wong; Jim Ross; Micky Minhas

(57) ABSTRACT

A cross-browser dialog platform is provided for supporting hosted web pages in a dialog, such that a web page may be used inside or outside the dialog. Select elements on the hosted page may be hidden when in a dialog, different behavior may be specified for hyperlinks inside or outside the dialog, and a proper size of the dialog may be inferred from its contents without designer input.

17 Claims, 12 Drawing Sheets

CROSS-BROWSER WEB DIALOG PLATFORM

BACKGROUND

Web applications are becoming more popular for client/server communication. Web applications can be located on servers within an enterprise or online (hosted offering) and accessed by clients for a wide variety of operations. Document sharing, search, analysis, reporting, data mining are just a few examples of web applications. Users access a web application usually through a browsing application that enables them to select among available documents and/or services. During the interaction, a user may provide various inputs such as names of requested documents, services, etc. The user may also edit and/or view documents through the browsing application with the help of a user interface that is similar to one of a local application.

Pop-ups, dialog boxes, and task panes are user interfaces that may be used by a web application, but not necessarily in a consistent manner. The appearances of these user interfaces may differ. Furthermore, as the browser processes a navigation event, the user also processes the event and may be taken out of her current context (e.g. new pages being opened).

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a cross-browser dialog platform that supports hosting web pages in a dialog, such that a web page may be used inside or outside the dialog. According to some embodiments select elements on the hosted page may be hidden when in a dialog, different behavior may be specified for hyperlinks inside or outside the dialog, and a proper size of the dialog may be inferred from its contents without designer input.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
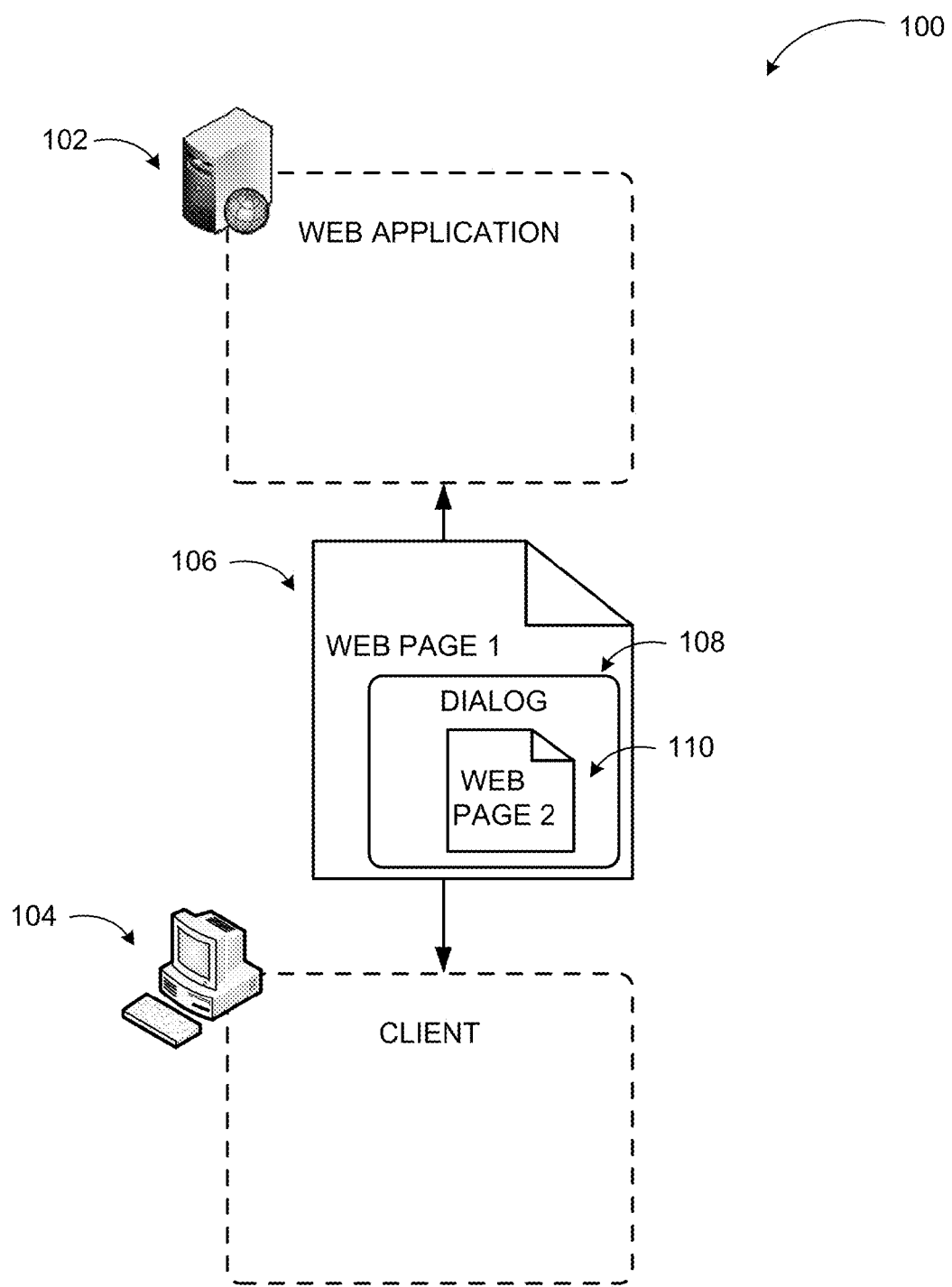
FIG. 1 is a conceptual diagram illustrating relationships between web pages and dialogs in a web application implementation.

As briefly described above, web pages may be hosted with a dialog through hiding select elements of the hosted web page when in a dialog, implementing different behaviors for hyperlinks inside or outside a dialog, and inferring a size of a dialog from its contents. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computer and network operations, which may provide web applications with hosted web pages and dialog interactions. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating relationships between web pages and dialogs in a web application implementation. The networked web application environment shown in diagram 100 is for illustration purposes. Embodiments may be implemented in various networked environments such as enterprise-based networks, cloud-based networks, and combinations of those.

In a conventional system, a user has locally installed applications on their computing device for editing or viewing documents, performing computations or analyses, storing data, and other tasks. Such applications not only consume resources, but they also present the challenge of each user's machine having to be set up initially, maintained with hardware and software upgrades, debugged individually in case of problems, etc.

Increasingly popular, web applications are replacing the individual computing model in a networked environment. In a typical operation, a user may access web application 102 through a browsing application executed on their client device 104. The services are usually provided through one or more web pages. For example, the user may access a document sharing service. The service may present a list of available documents through a graphical user interface in a first web page. Upon selection of a document from the list, the selected document may be made available through a second web page. The user may be enabled to edit, view, or perform similar tasks on the selected document through user interface elements provided on the second web page. If the user performs multiple tasks successively such as editing the document, viewing it, then editing more, and viewing again, a new web page may be opened each time, or at least a complete change may occur introducing breaks in the context for the user.

In a system according to embodiments, user access to web application is provided through web page 1 (106). Dialog 108 may be opened within web page 1 (106) to enable the user make selections, provide input, etc. A subsequent step in the user—web application interaction may involve web page 2 (110), which may provide additional services to the user with a different set of user interface elements. For example, web page 1 (106) may provide a list of available documents from a document sharing service. By clicking on a control, the user may activate dialog 108, which may enable the user to indicate desired document(s), provide credentials for authentication purposes, select various options, etc. Upon completion of the user's entries or selections in the dialog 108, web page 2 (110) enabling the user to edit the selected document(s) may be opened within dialog 108 while user interface elements of web page 1 (106) are hidden (e.g. grayed). A size of dialog 108 may be automatically adjusted to accommodate web page 2 (110) and hyperlink behaviors within the dialog (and/or web page 2) may be modified for compatible operations. Thus, the user may experience a consistent context as they navigate through the web application.

The example system in FIG. 1 has been described with specific servers, client devices, web applications, and interactions. Embodiments are not limited to systems according to these example configurations. A cross-browser web dialog platform may be implemented in configurations employing fewer or additional components and performing other tasks. Furthermore, specific protocols and/or interfaces may be implemented in a similar manner using the principles described herein.

FIG. 2A through 2E illustrate an example user experience when using a document share web application when navigation events cause context breaks. As mentioned above, a user may access a web application such as a document sharing service through browsing application 220. Browsing application 220 has standard user interface elements such as a text box for entering the Uniform Resource Locator (URL) address of the web application, a search box, and textual or graphical controls like "file", "view", "edit" menus, etc. The controls may provide the user a drop-down menu, a hover-on menu, or similar options for selecting various tasks associated with the browsing application 220.

Figure 2A:
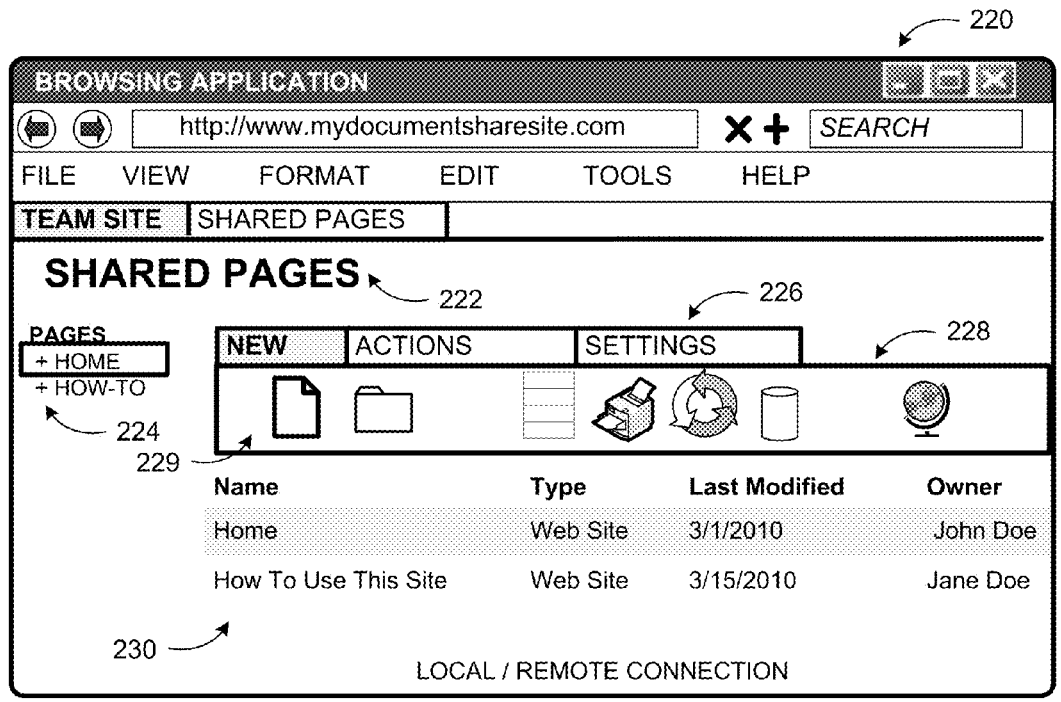
FIG. 2A through 2E illustrate an example user experience when using a document share web application when navigation events cause context breaks.

The example web application may include a number of top level web pages such as "Team Site" and "Shared Pages", which may be presented using tabs or similar presentation methods. In the example of FIG. 2A, the user is at the "Shared Pages" (222) top level page of the web application. A tree-structure menu of available pages (224) may be provided on one side of the displayed web page. The top page of the web application "Shared Pages" 222 presents a list of available web pages (230) with additional information such as page type, modification date, owner, etc., as well. User interface elements such as graphical controls 228 enable the user select tasks associated with the listed web pages. For example, the user may select one of the pages and then click on print, publish, store, or share icons. Similarly, controls for creating a new page (229) and opening a folder are also provided. Operations associated with the top level page of the web application may further be presented in a tabbed format (226), where relevant operations and views may be grouped under predefined categories like "New", "Actions", or "Settings".

Figure 2B:
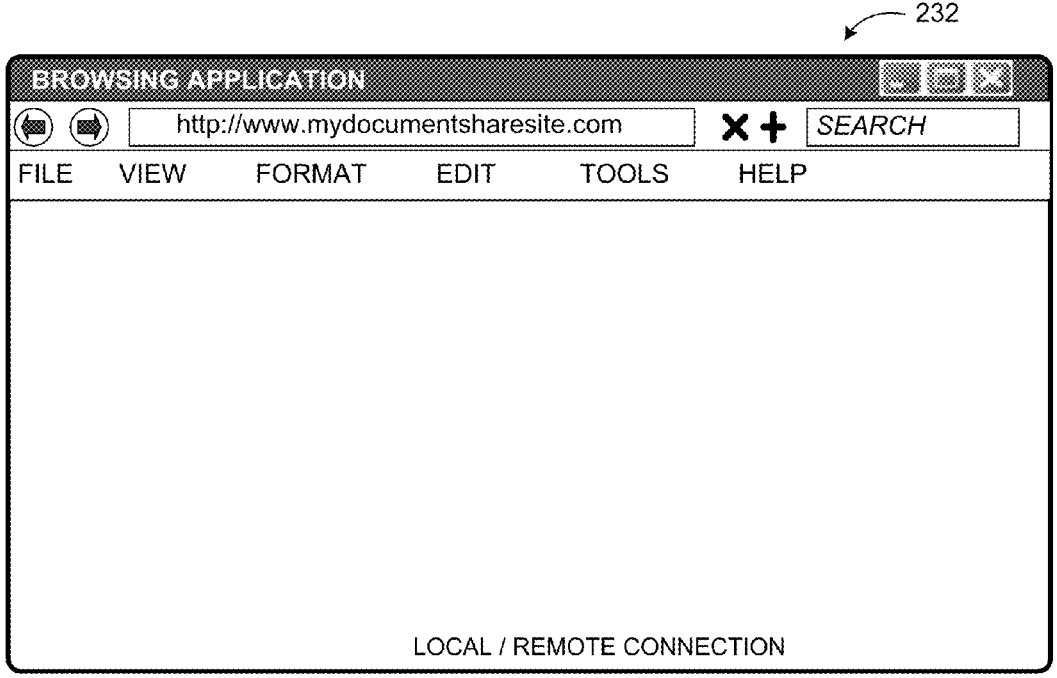
Figure 2C:
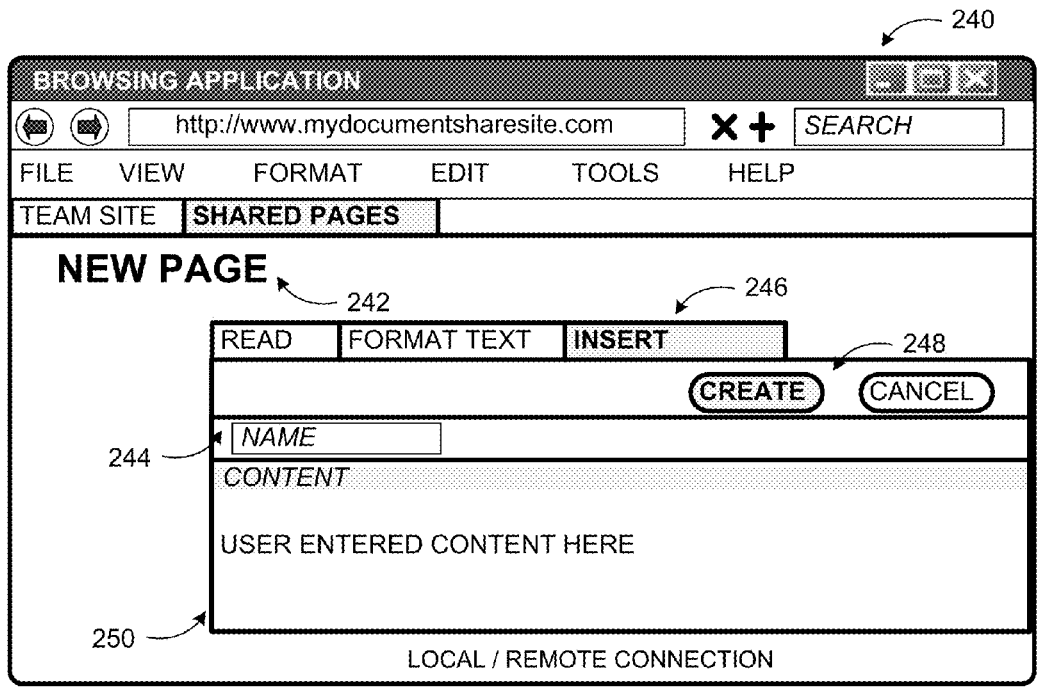
Figure 2D:
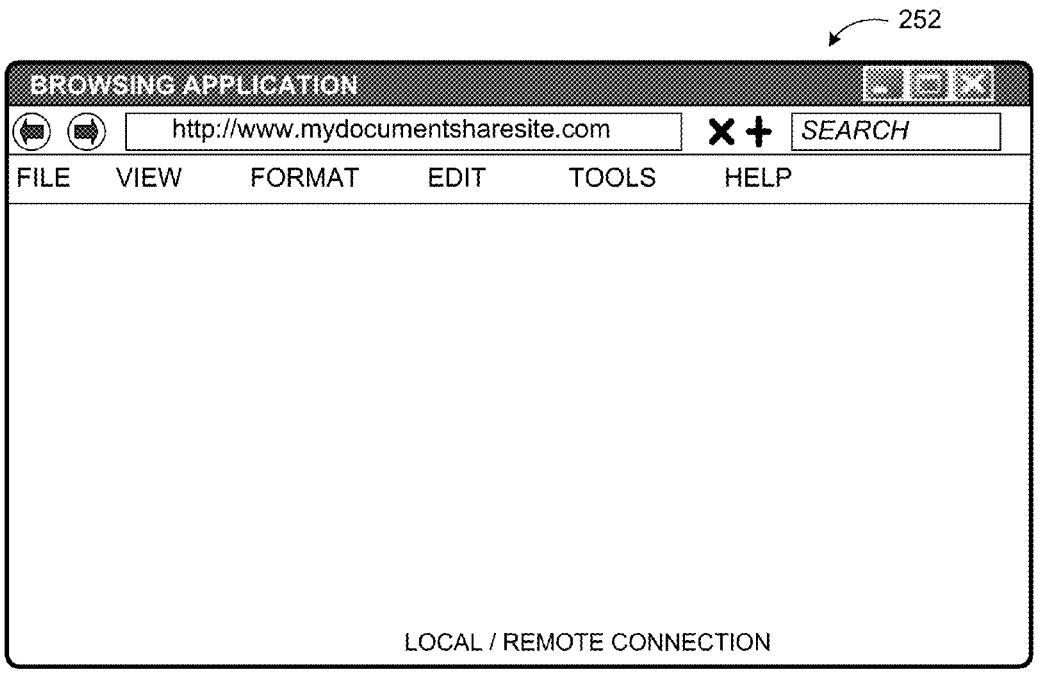

If the user selects to the option to create a new page by clicking on the new page (229) icon, a new web page may be opened in a new view pane of the browsing application or loaded in place of the existing view as shown in FIG. 2C (reference numeral 240) according to conventional systems. In the process, old content may disappear. This results in the user being taken out of their context during the navigation event. Thus, the navigation process includes a blank page 232 during the transition as represented in FIG. 2B.

The web page (New Page) 242 displayed by the browsing application in FIG. 2C provides the user with user interface controls for editing the new page. According to the illustrated example, three distinct sets of functionalities are provided by tabs 246, "read", "format text", and "insert". These are examples of basic web page content creation and viewing. Of course, other functionalities such as addition and processing of graphic elements, audio/video content, and others may also be provided in a similar manner. The user may be prompted to enter a name (244) for the new page and the content (250). When the user is done, they may indicate completion by clicking on "create" button 248, which may prompt transitioning into yet another view of the browsing application as shown in FIG. 2E (reference numeral 260).

Figure 2E:
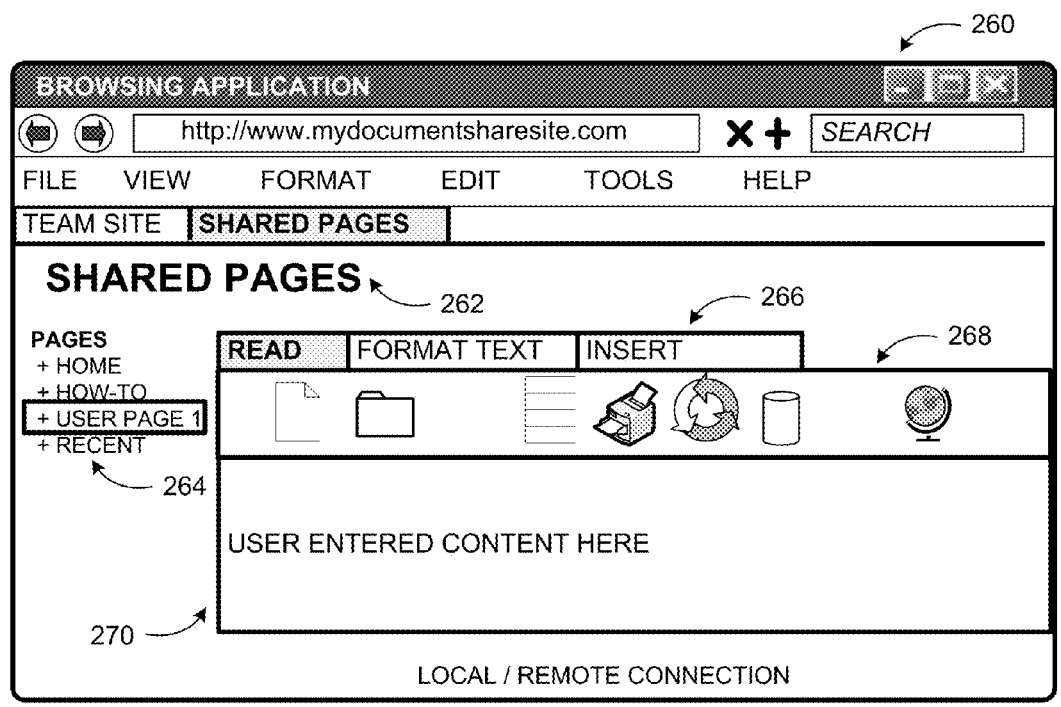

The view 260 in FIG. 2E displays the "Shared Pages" 262 of the web application again. This time, the newly created web page content 270 is displayed along with the three example tabs 266 ("read" tab selected) and controls 268, which enable the user to print, publish, store, or share the newly created page. The tree-structure page list 264 on the left side of the view is also updated with the addition of the new page. The transition from the edit user interface of FIG. 2C to the read view of FIG. 2E results in another break in the context as discussed above represented by the blank page 252 of FIG. 2D.

FIG. 3A through 3D illustrate an example user experience when using a document share web application according to embodiments, where web pages are hosted within dialogs. Browsing application user interface 300 in FIG. 3A also has standard user interface elements such as a text box for entering the Uniform Resource Locator (URL) address of the web application, a search box, and textual or graphical controls like "file", "view", "edit" menus, etc. The controls may provide the user a drop-down menu, a hover-on menu, or similar options for selecting various tasks associated with the browsing application user interface 300.

Figure 3A:
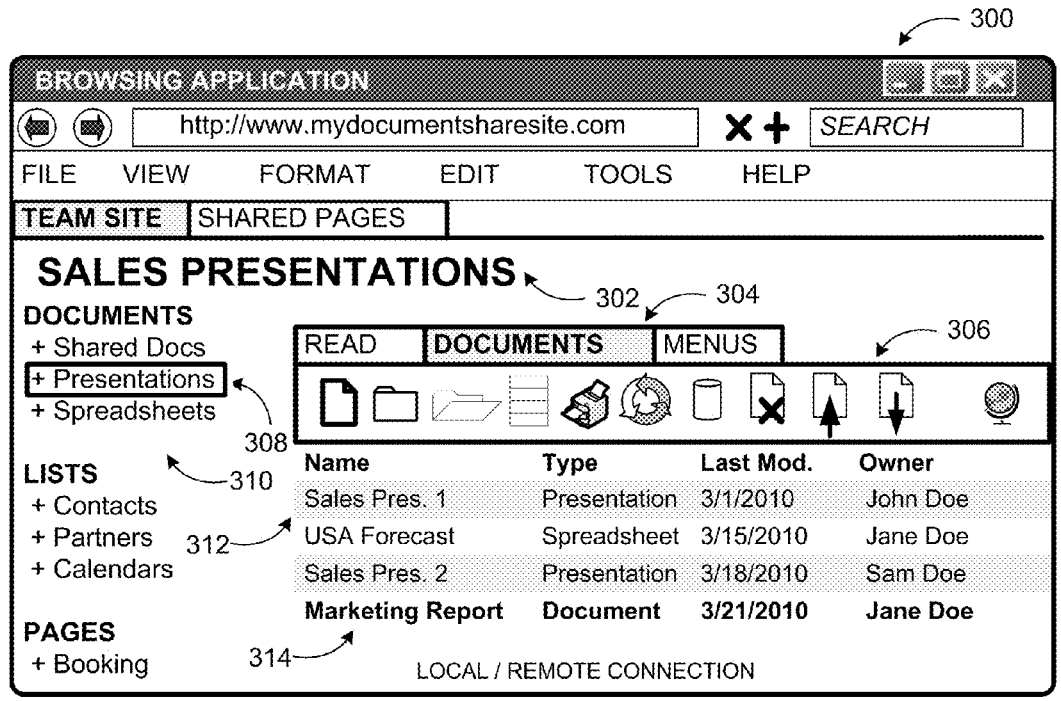
FIG. 3A through 3D illustrate an example user experience when using a document share web application according to embodiments, where web pages are hosted within dialogs.

The example web application in FIG. 3A includes a "Team Site" and a "Shared Pages" top level pages, of which "Sales Presentations" 302 is displayed to the user. "Sales Presentations" 302 may be part of the "Team Site" as indicated by the highlighted "Team Site" tab. A tree-structure menu of available pages (310) is provided on one side of the displayed web page. In the menu, "Presentations" 308 is selected as indicated by the highlight box on the selected item. The main view pane of the user interface provides a list of documents 312 available under the selected item.

The list of available documents is presented in a tabbed format 304 categorizing functionalities according to three example groups "Read", "Documents", and "Menus". Graphical controls 306 as discussed above are also provided on top of the list of available documents 312. Among, the list of available documents 312, a document called "Marketing Report" 314 is selected as indicated by the textual highlighting.

Figure 3B:
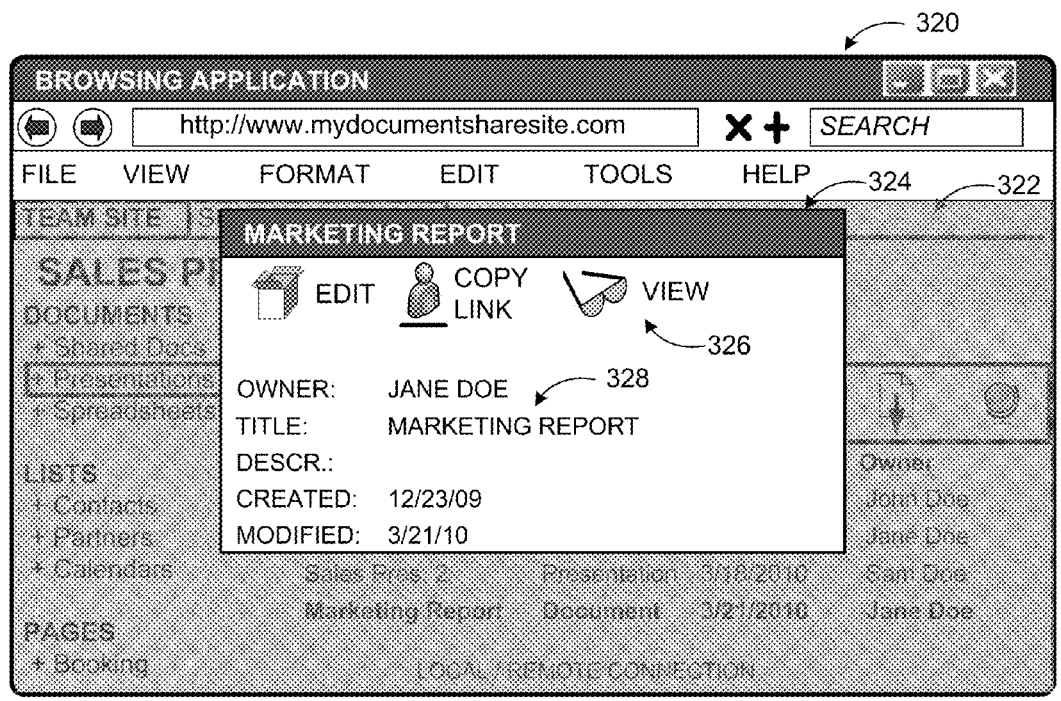

FIG. 3B illustrates a next step view of the browsing application user interface 320 upon selection of the example document "Marketing Report" 314 in the previous screen. A dialog 324 is presented within the browsing application user interface 320, while other displayed elements 322 associated with the "Sales Presentation" 302 page are hidden. The hiding may take different forms. According to one embodiment, the elements 322 may be grayed (in a transparent manner) such that a context for the user is not lost, but the attention of the user is focused on the dialog 324. Main controls of the browsing application user interface 320 may be left in an active mode or hidden as well. Other forms of hiding the elements 322 may include a change of text and graphic colors (to lighter colors for example), employing various transparency factors, and the like.

Dialog 324 includes a limited number of controls 326 (e.g. "Edit", "Copy Link", and "View") to enable to the user to interact with the dialog, while keeping the elements of the dialog to a manageable number. As discussed previously, a full menu of controls may not fit into a smaller dialog. On the other hand, employing a large dialog or a completely new web page may break the context for the user. Dialog 324 further includes summary information 328 about the selected document such as owner, title, description, creation date, and modification date.

Figure 3C:
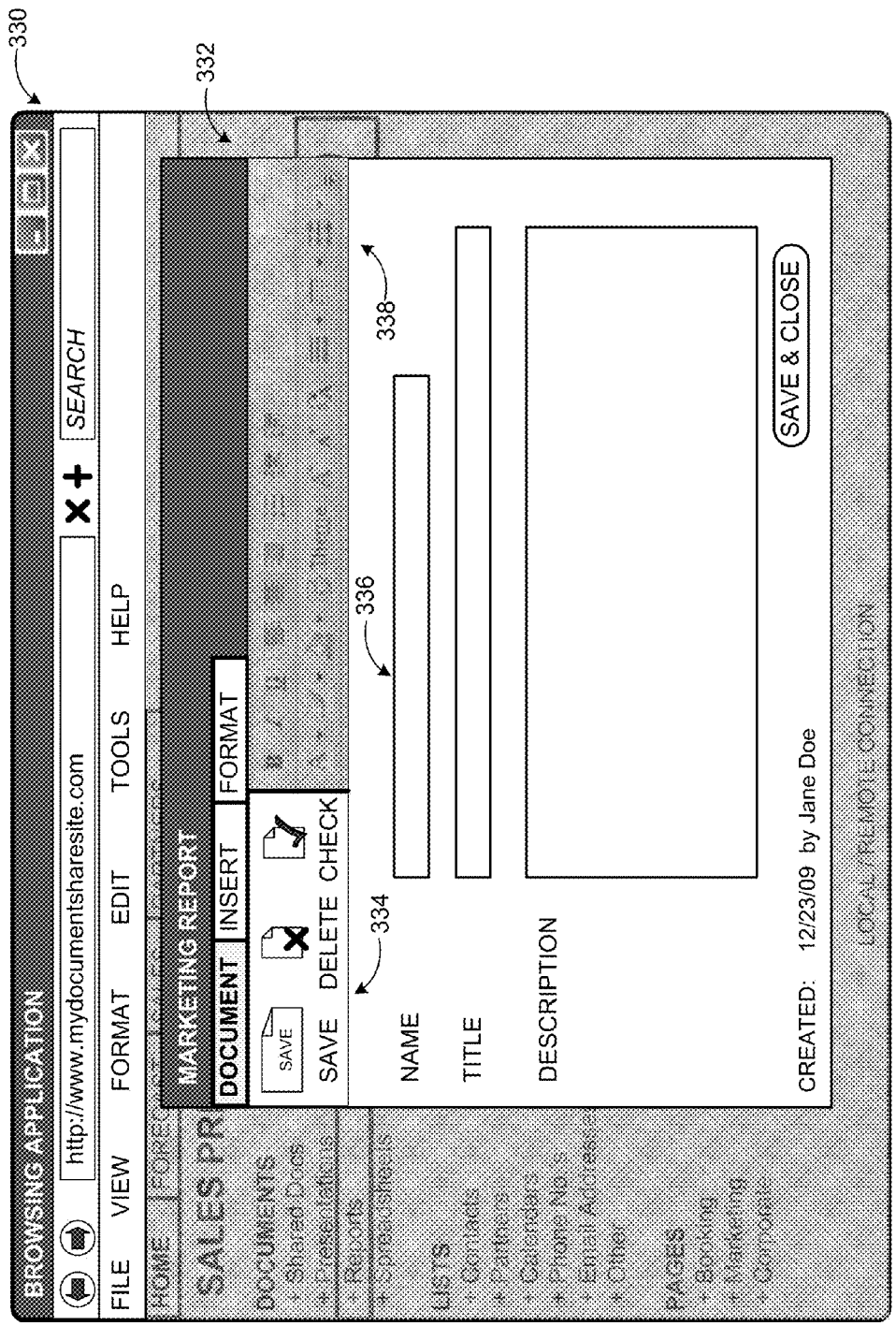
Figure 3D:
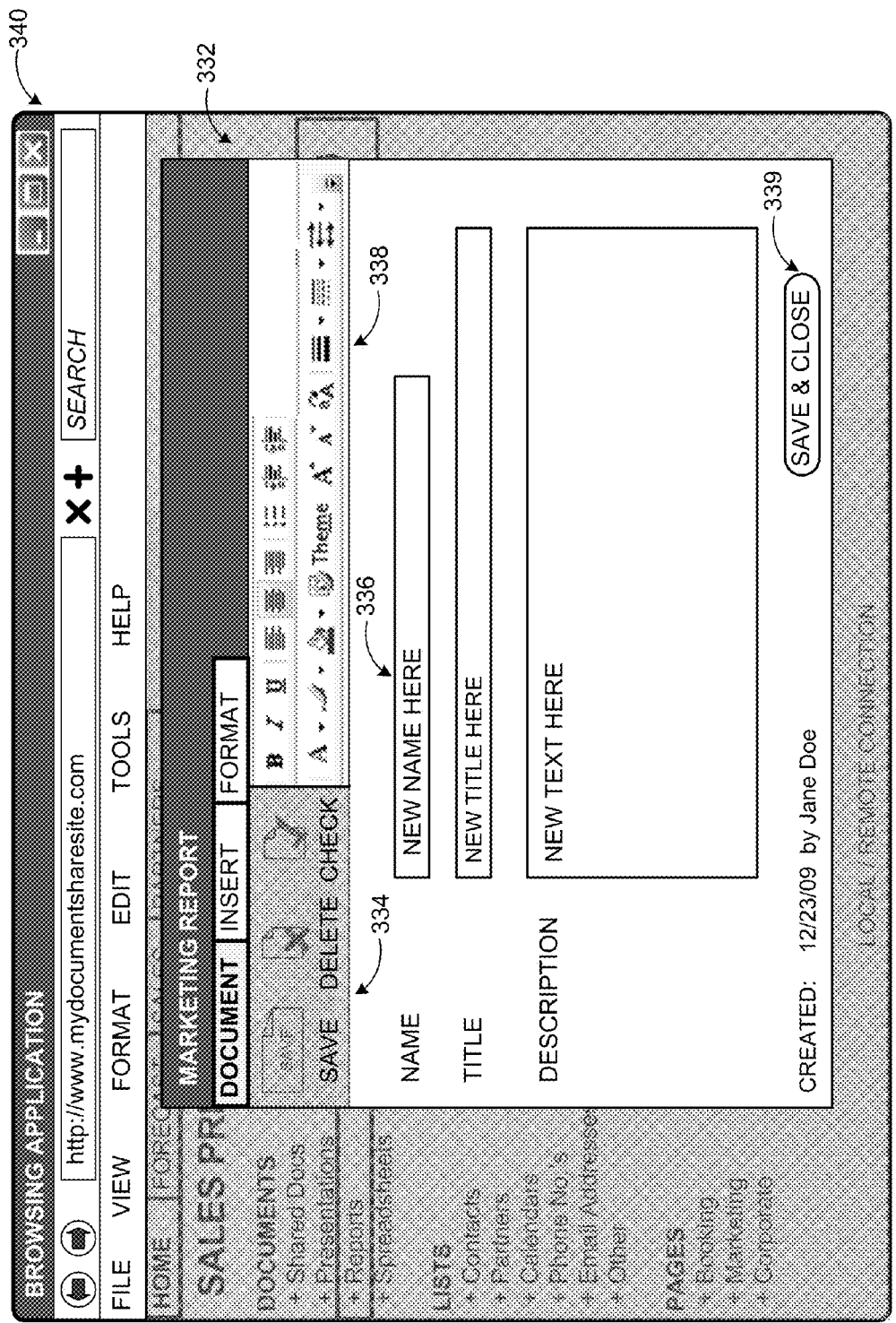

Thus, the user may select to edit the selected document, view in a web page, or copy the link to the selected document (to be pasted later). Upon selection of the "Edit" control, the browsing application may transition to user interface 330 as shown in FIG. 3C. In user interface 330, the user is provided with options to modify the name (of the owner), the title and description of the document through text boxes 336 within dialog 332. At this initial phase of modification, another limited set of controls 334 (e.g. "Save", "Delete", "Check") may be provided. Another set of controls 338 for editing content properties may be hidden (e.g. through graying) because they are not applicable yet.

In a web dialog according to embodiments, a subset of page contents may be shown inside the dialog 332, such that common elements with the main web page user interface are not displayed when the page is in a dialog. This may be accomplished by providing a Cascading Style Sheet (CSS) class that is applied when the page is hosted in a dialog and any elements that have the same CSS class applied are hidden when the page renders. CSS is a style sheet language for describing presentation semantics (i.e. look and formatting) of a document written in a markup language. CSS enables primarily the separation of document content (written in a markup language) from document presentation including elements such as the layout, colors, and fonts.

Browsing application user interface 340 illustrates the change in dialog 332, when the user begins entering text (or other content) into the text boxes 336 provided for modifying the selected document. Since the user is in content input mode now, the first set of controls 334 associated with saving, deleting, or checking the entire document are hidden (e.g. grayed). Content property controls 338 are made active. As discussed above, these controls may be limited such that an overlap with the main page user interface is avoided. Upon completion of the editing, the user may be provided with the option to save and close (339) the document, and the document may be made available in the document list of FIG. 3A in its new form.

Figure 4:
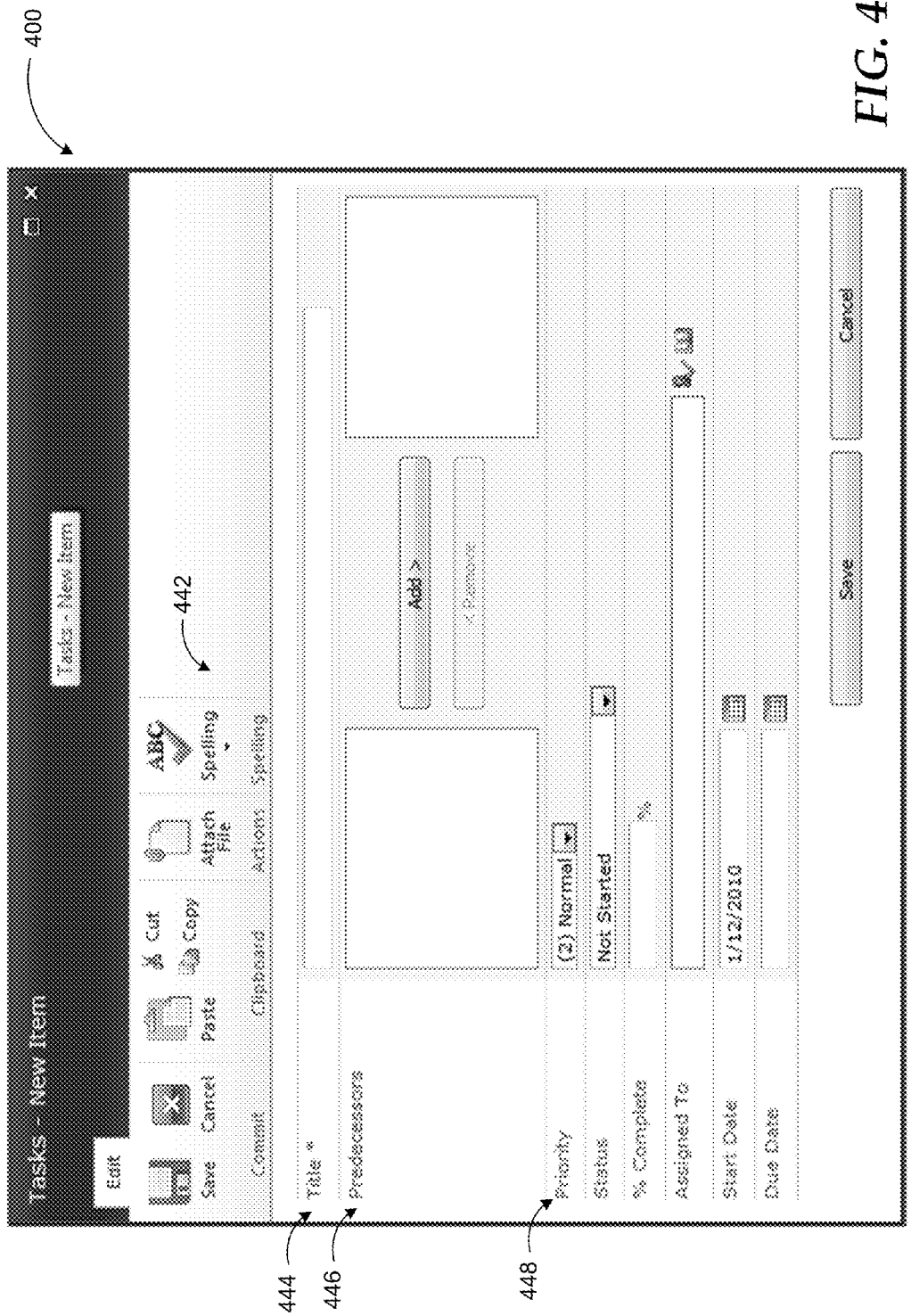
FIG. 4 illustrates an example user interface for editing a web-based document in a system according to embodiments.

FIG. 4 illustrates an example user interface 400 for editing a web-based document in a system according to embodiments. User interface 400 enables a user to modify (or create) properties of a web page such as title 444, predecessors 446, priority 448, and others. Graphical and textual control elements such as menu items 442 may be provided in a selective manner to maintain consistency of the user interface as a dialog within a web page.

Modal dialog implementations provided by web browsers may differ in Application Programming Interface (API) and/ or functionality, and some browsers may not provide one. To create a cross-browser implementation, a system according embodiments may employ a cross-browser script and CSS, which hosts a web page in a frame element of the parent page. The cross-browser script may be according to European Computer Manufacturers Association (ECMA) International Specification or a similar standardized script. Scripts are distinct from a core code of the application, as they are typically written in a different language and may often be created or at least modified by the end-user. Scripts may often be interpreted from source code or byte code, where the applications they control are traditionally compiled to native machine code. A script language or extension language is a programming language that allows control of one or more software applications. Script languages are frequently embedded in the applications they control.

Another aspect of a web dialog platform according to embodiments is the ability to automatically size the dialog properly for a wide variety of content and viewport sizes. This may be achieved by rendering the page content at a fixed size outside the viewport; determining the scrollable width and height of the body element of the hosted page; determining the size of the viewport of the parent page; and setting the new width and height of the dialog to the lesser of the width and height of the body element of the hosted page and the viewport of the parent page. The auto-sizing of the dialog may adjust the width and height independently.

Dialog auto-sizing may be applied under different scenarios, where the contents of the page hosted in the dialog may change dynamically. For example, on a document sharing web page listing available documents, users may add/ remove columns, which may add/remove fields on a list form and thus changing the form size. According to another example, a localized application may change the strings on a page to a different language and cause the size of the page to shrink or grow. Imposing an initial fixed size for these scenarios may inevitably result in a dialog that is too small and has scrollbars, or is too large and has a lot of unnecessary white space. A dialog according to embodiment may calculate the size of the contents and resize itself accordingly.

Yet a further aspect of a web dialog platform according to embodiments includes the ability to specify different behavior for hyperlinks on a page based on whether the page is hosted in a dialog or a full browser user interface. This may be accomplished by defining navigation options for a link (within the dialog, in a new browser window, or in the parent browser window); using a markup language attribute for a link between two pages (e.g. the "rel" HTML attribute) or a parameter on the hyperlink's query string to define the navigation behavior; on page load of the hosted page, iterating through anchor tags on the hosted page to find hyperlinks with either the relevant markup language attribute or query string key; and modifying the hyperlinks on the hosted page to use the dialog-specific behavior when selected.

When a dialog contains a link, the target of selecting that link may depend on a desired user experience. In some cases, the user may want the link to change the dialog contents, and in other cases the user may want to have it open in a new browser window. A dialog platform according to embodiments may interpret links based on both markup and query string parameters.

Figure 5:
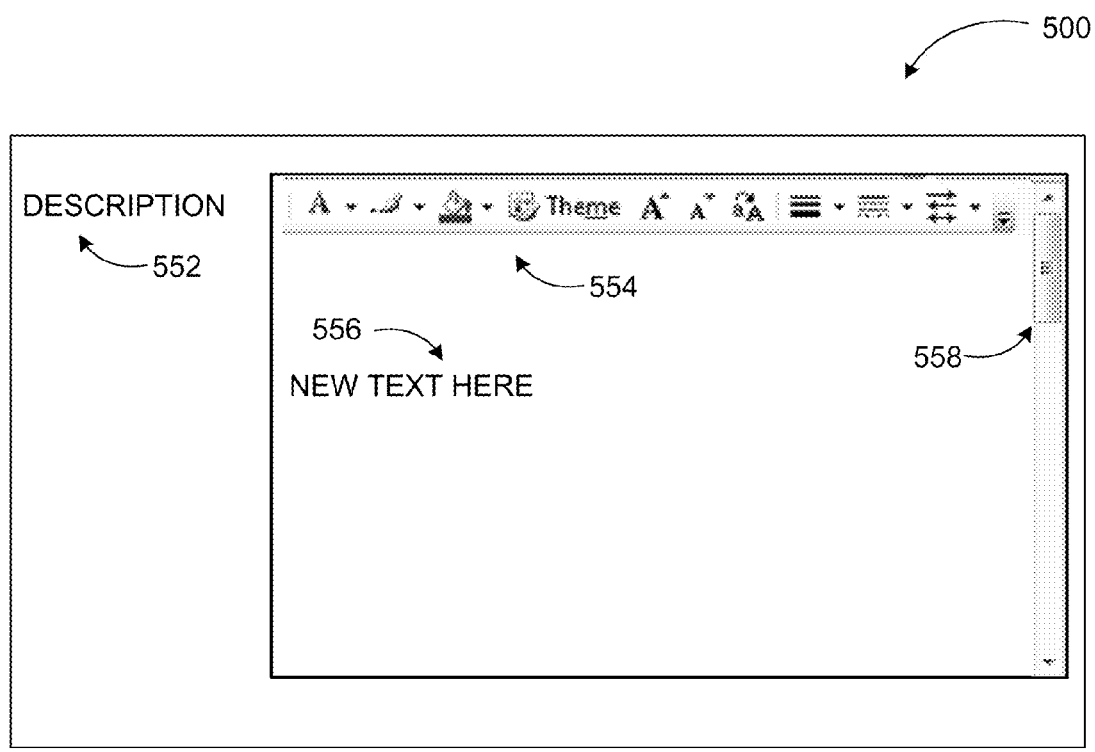
FIG. 5 illustrates a document editing user interface that may be integrated into the user interface of FIG. 4.

FIG. 5 illustrates a document editing user interface that may be integrated into the user interface of FIG. 4. User interface 500, provides a content entry box 556 under the heading "Description" 552 with a limited set of controls 554 and scroll bar 558. The number of controls 554 as well as the size of the controls and the scroll bar 558 may be adjusted automatically based on contents of the dialog as discussed previously.

The examples in FIGS. 3, 4, and 5 have been described with specific document types, user interface elements, configurations, and interactions. Embodiments are not limited to systems according to these example configurations. A cross-browser web dialog platform may be implemented in configurations using other types of documents, user interface elements, and configuration in a similar manner using the principles described herein. For example, instead of CSS, a Extensible Markup Language (XML) namespace with semantic markup may be employed as a filter.

Figure 6:
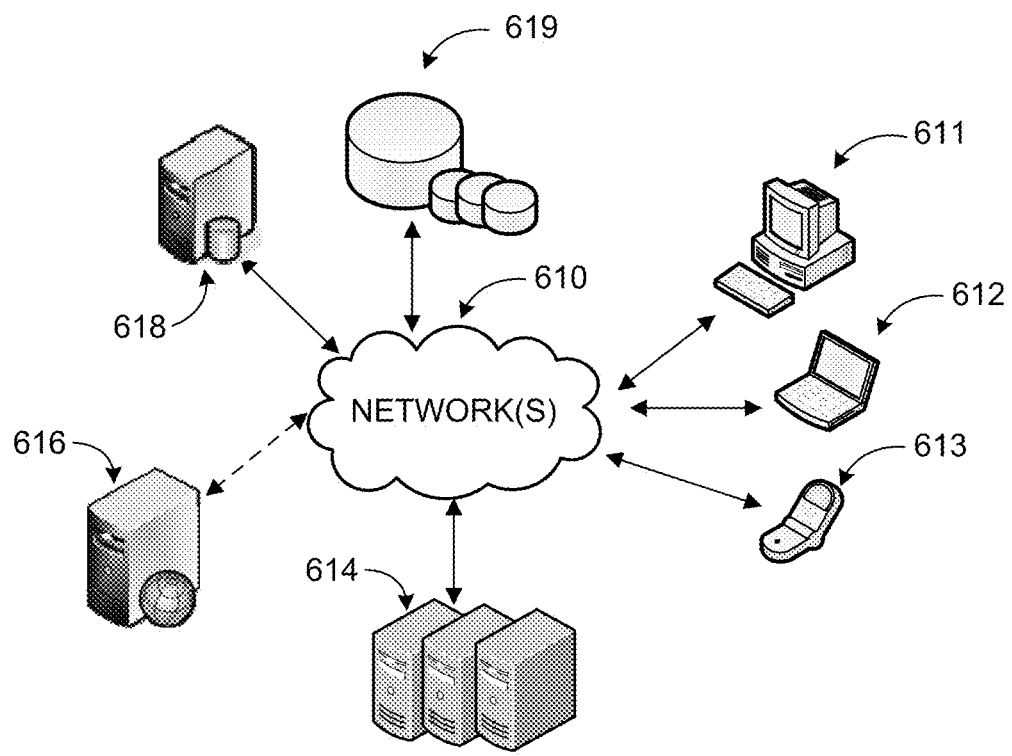
FIG. 6 is a networked environment, where a system according to embodiments may be implemented.

FIG. 6 is an example networked environment, where embodiments may be implemented. A cross-browser dialog platform enabling use of hosted web pages inside or outside a dialog may be implemented via software executed over one or more servers 614 such as a hosted service. The platform may communicate with client applications on individual computing devices such as a smart phone 613, a laptop computer 612, or desktop computer 611 ('client devices') through network(s) 610.

Client applications executed on any of the client devices 611-613 may interact with a web application through a browsing application on the servers 614, or on individual server 616. User interface elements of the hosted page may be hidden selectively when in a dialog, different behavior may be specified for hyperlinks inside or outside the dialog, and/or a proper size of the dialog may be inferred from its contents without designer input as discussed previously. The web application may retrieve relevant data from data store(s) 619 directly or through database server 618, and provide requested services (e.g. document editing) to the user(s) through client devices 611-613.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a platform for cross-browser web dialog. Furthermore, the networked environments discussed in FIG. 6 are for illustration purposes only. Embodiments are not limited to the example applications, modules, or processes.

Figure 7:
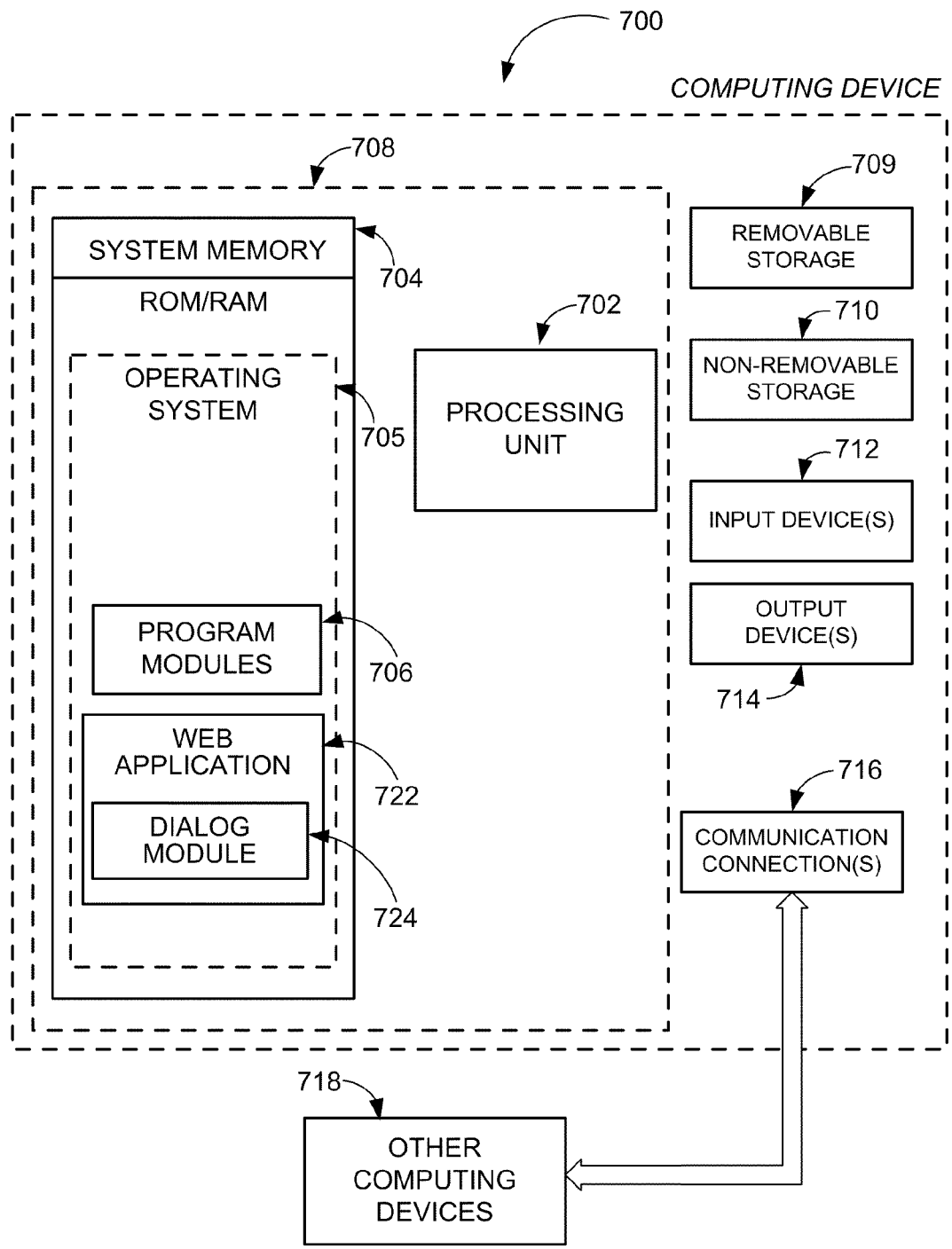
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a server executing a web application capable of providing hosted web pages inside or outside a dialog according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, web application 722, and dialog module 724.

Web application 722 may provide web-based services such as viewing, editing, and comparable processing of documents to remote users through a browsing application on the user's client device. Through the dialog module 724, web application 722 may display hosted web pages inside or outside a dialog, hide select elements of the hosted web page when in a dialog, and specify different behavior for hyperlinks inside or outside the dialog as discussed previously. Moreover, a web application according to embodiments may support multiple layers of dialogs that may be opened at the same time. Web application 722 and dialog module 724 may be separate applications or an integral component of a hosted service. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, other web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
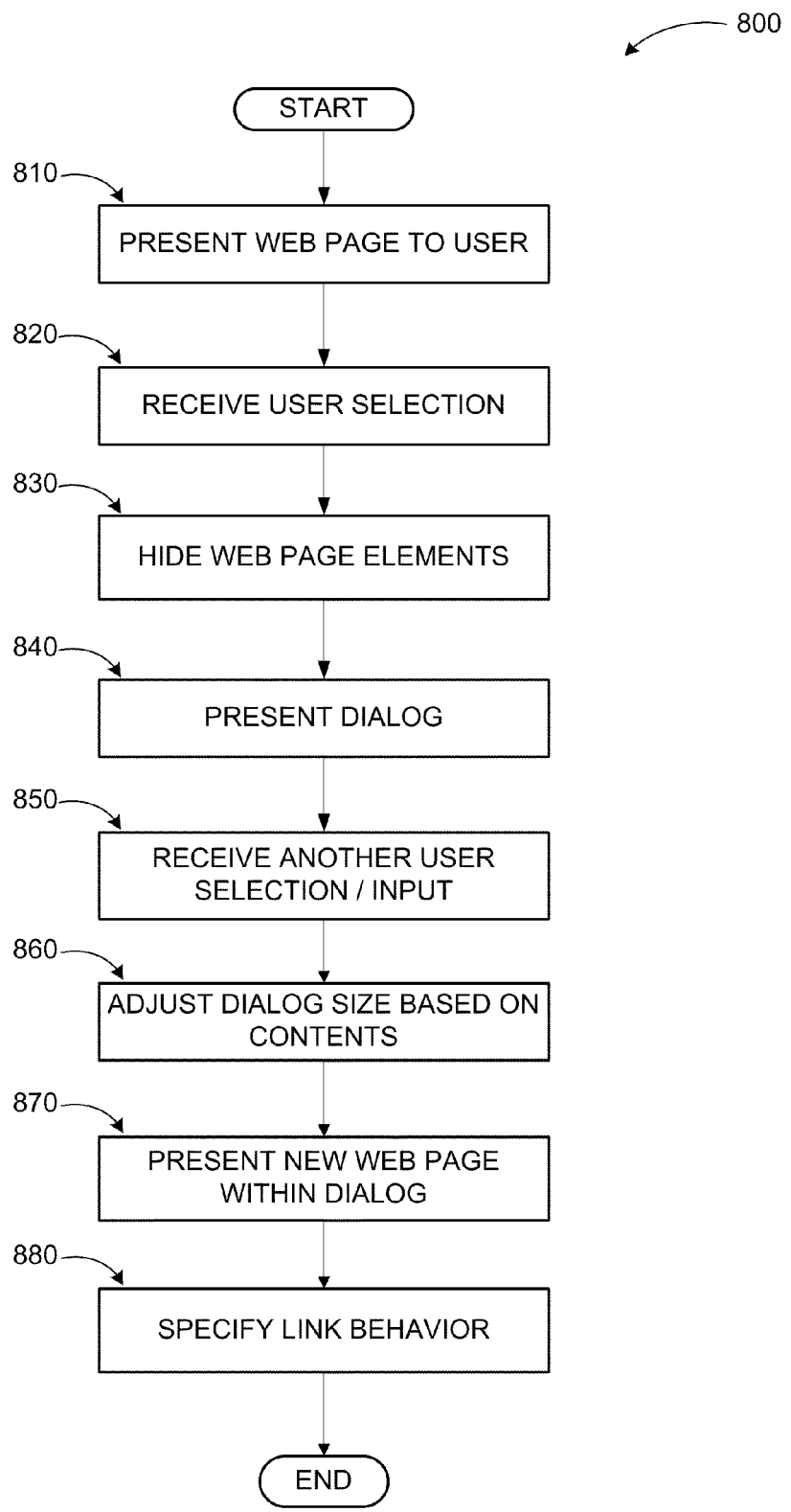
FIG. 8 illustrates a logic flow diagram for a process of providing a dialog platform that supports hosting web pages in a dialog according to embodiments.

FIG. 8 illustrates a logic flow diagram for process 800 of providing a dialog platform that supports hosting web pages in a dialog according to embodiments. Process 800 may be implemented as part of a web application executed on a server.

Process 800 begins with operation 810, where a web page is presented to a user through a browsing application on a client machine associated with the user. At operation 820, a user selection is received indicating the user's desire to create/edit/view/remove a document or perform comparable actions on the web application. In response to the received user selection, at least a portion of the web page elements may be hidden as discussed previously at operation 830 and a dialog presented within the browsing application user interface on top of the hidden web page elements at operation 840.

Contents of the dialog may reflect a selection of controls and/or information associated with the user indicated action in operation 820. At operation 850, another user selection or input based on the presented controls may be received. For example, the user may select to edit an existing document, create a new document, or perform a similar action. Based on the received user selection or input, a new web page displaying relevant controls associated with the desired action(s) may be presented on top of the hidden elements within a dialog at operation 870. Before the new web page is displayed within the dialog, a size of the dialog may be adjusted based on contents of the new web page at operation 860 preceding operation 870. Moreover, portions of controls on the new web page may be dynamically hidden and activated based on user activity. A portion of the elements within the dialog may also be hidden by selectively removing the elements from the displayed web page. A behavior of hyperlinks within the presented content of the new web page may be specified by the platform depending on inferred user intention such as opening a new web page inside the dialog or outside the dialog.

The operations included in process 800 are for illustration purposes. A cross-browser web dialog platform may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a cross-browser web dialog platform, the method comprising:
   presenting a web page to a user from a web application;
   in response to receiving a user selection, hiding at least a portion of displayed web page elements;
   presenting a dialog over the hidden web page elements within the web page;
   displaying a subset of contents of the web page inside the dialog such that common elements with a web page user interface are not displayed when the dialog is presented;
   in response to a user interaction with the web page inside the dialog changing to a content input mode, hiding controls associated with saving, deleting, and checking entire content by at least one from a set of: graying the controls, rendering the controls transparent, and modifying text and graphics colors; and
   presenting one or more links within the new web page by:
      interpreting the links within the new web page for desired link behavior; and
      specifying separate behaviors for the links based on the interpretation.

2. The method of claim 1, wherein specifying separate behaviors for the links includes:
   defining the separate behaviors based on one of: a markup language attribute for each link and a parameter on each link's query string;
   on page load of the web page, iterating through anchor tags on the web page to determine links with a relevant one of a markup language attribute and a query string key; and
   modifying one of the markup language attribute and the parameter for each of the links on the web page to employ a dialog-specific behavior when selected.

3. The method of claim 2, wherein the separate behaviors for the links include displaying a link target in one of: the dialog, a new browsing application user interface, and within the existing web page.

4. The method of claim 1, further comprising:
automatically adjusting a size of the dialog based on at least one of a current view port size and a size of contents of the dialog.

5. The method of claim 1, further comprising:
hiding a portion of elements within the dialog by selectively removing the elements from the displayed web page.

6. The method of claim 1, further comprising:
implementing the web dialog platform in a cross-browser manner by employing a cross-browser script and style class enabling hosting of the new web page in a frame element of the web page.

7. The method of claim 1, wherein the user interface controls include textual and graphical controls, and wherein at least a portion of the controls activate, when selected, one of a drop-down menu and a hover-on menu.

8. A server for providing a web application employing a cross-browser web dialog platform, the server comprising:
a memory;
a processor coupled to the memory, the processor executing web dialog platform, wherein the web dialog platform is configured to:
present a parent web page to a user;
in response to receiving a user selection, hide at least a portion of displayed web page elements by one of graying the elements, rendering the elements transparent, and modifying text and graphics colors;
present a dialog over the hidden web page elements within the parent web page;
in response to receiving another user selection through the dialog, present a new web page within the dialog, wherein
a size of the dialog is adjusted automatically based on at least one of the contents of the new web page and a size of a view port displaying the web page,
a portion of elements on the new web page are hidden by removing the elements selectively from the new web page, the selective removal including hiding of controls associated with saving, deleting, and checking entire content by at least one from a set of: graying the controls, rendering the controls transparent, and modifying text and graphics colors in response to a user interaction with the new web page changing to a content input mode, and
the one or more controls are displayed upon completion of the content input mode;
present one or more links within the new web page, wherein a behavior of the links within the new web page is specified based on interpreting the links within the new web page for desired link behavior and specifying separate behaviors for the links based on the interpretation.

9. The server of claim 8, wherein the web dialog platform is further configured to:
render the dialog at a fixed size outside the view port;
determine a scrollable width and height of a body element of the new web page;
determine the size of the view port of the parent web page; and
set a new width and height of the dialog to a lesser one of the width and height of the body element of the new web page and the viewport of the parent page.

10. The server of claim 8, wherein the web dialog platform is further configured to:
provide a Cascading Style Sheet (CSS) class that is applied to the new web page hosted within the dialog; and
hide any web page elements sharing the same CSS class when the new web page is rendered.

11. The server of claim 8, wherein the web dialog platform is further configured to:
dynamically hide and activate portions of controls on the new web page based on user activity.

12. The server of claim 8, wherein the web dialog platform is further configured to:
interpret the links within the new web page based on one of markup language attributes and query string parameters associated with the links; and
specify behaviors for the links based on the interpretations.

13. The server of claim 8, wherein the dialog and the new web page present controls in a tabbed format categorizing functionalities.

14. A computer-readable storage medium with instructions stored thereon for providing a document sharing web application employing a cross-browser web dialog platform, the instructions comprising:
presenting a parent web page to a user;
in response to receiving a user selection, hiding at least a portion of displayed web page elements;
presenting a dialog over the hidden web page elements within the parent web page with a limited set of control elements such that overlapping control elements with the web page user interface are avoided;
in response to receiving another user selection through the dialog, presenting a dialog-hosted web page within the dialog by employing a cross-browser script and style class enabling hosting of the dialog-hosted web page in a frame element of the parent web page;
displaying a subset of parent web page contents inside the dialog such that controls associated with saving, deleting, and checking entire content are hidden by at least one from a set of: graying the controls, rendering the controls transparent, and modifying text and graphics colors in response to a user interaction with the dialog-hosted web page changing to a content input mode and the one or more controls are displayed upon completion of the content input mode;
automatically adjusting a size of the dialog based on at least one of the contents of the dialog-hosted web page and a size of a view port displaying the parent web page;
presenting one or more links within a new web page;
interpreting the links within the dialog-hosted web page for desired link behavior based on one of markup language attributes and query string parameters associated with the links; and
implementing separate behaviors for the links based on the interpretation; and
modifying one of a markup language attribute and a parameter for each of the links within the dialog for operational compatibility with links within the parent web page such that the user experiences a consistent context when navigating through the web application.

15. The computer-readable medium of claim 14, wherein the instructions further comprise:
adjusting a width and a height of the dialog independently from each other in response to a dynamic content change on the dialog-hosted web page.

16. The computer-readable medium of claim 14, wherein the instructions further comprise:
rendering the parent web page content at a fixed size outside the viewport;
determining a scrollable width and height of a body element of the dialog-hosted page;

determining the size of the viewport of the parent web page; and setting a new width and height of the dialog to a lesser one of the width and height of the body element of the dialog-hosted web page and the viewport of the parent web page.

17. The computer-readable medium of claim 14, wherein the dialog-hosted web page includes controls for one of: creating a new page, editing an existing page, and viewing a listed page.

* * * * *